(12) United States Patent
Oguri

(10) Patent No.: US 6,987,388 B2
(45) Date of Patent: Jan. 17, 2006

(54) DIGITAL MEASURING HEAD

(75) Inventor: Masaaki Oguri, Mitaka (JP)

(73) Assignee: Tokyo Seimitsu Co., Ltd., Tokyo (JP)

(*) Notice: Subject to any disclaimer, the term of this patent is extended or adjusted under 35 U.S.C. 154(b) by 0 days.

(21) Appl. No.: 10/635,681

(22) Filed: Aug. 7, 2003

(65) Prior Publication Data
US 2004/0027141 A1   Feb. 12, 2004

(30) Foreign Application Priority Data
Aug. 7, 2002   (JP)   ............... 2002-229550

(51) Int. Cl.
  *G01R 31/11*   (2006.01)
(52) U.S. Cl. .............. 324/534; 324/754; 324/716
(58) Field of Classification Search ........ 346/33 R–40; 702/166–168; 356/493–495, 600, 4.09; 33/504, 33/551; 324/754, 158.1, 534; 451/6; 600/401
  See application file for complete search history.

(56) References Cited

U.S. PATENT DOCUMENTS 3,232,099 A * 2/1966 Motchenbacher ........... 600/401
4,736,208 A * 4/1988 Schmidt .................... 346/33 R
4,770,536 A * 9/1988 Golberstein ................. 356/600
4,830,486 A * 5/1989 Goodwin ................... 356/4.09
5,031,360 A * 7/1991 Farnworth et al. ............ 451/6
5,517,307 A   5/1996 Buehring .................... 356/494

FOREIGN PATENT DOCUMENTS

JP        63-187006      11/1988
WO    WO 01/90698 A1    11/2001

* cited by examiner

Primary Examiner—Vincent Q. Nguyen
(74) Attorney, Agent, or Firm—Harness, Dickey & Pierce, P.L.C.

(57) ABSTRACT

A digital measuring head in a measuring apparatus measures a work by making a contact element abut to the work. The digital measuring head includes an arm supported rotatably around a support point arranged on a base; a finger having the contact element at a tip end and mounted to a tip end portion of the arm; and a scale and a read head, one of which is provided at a rear end portion of the arm and the other of which is arranged on the base. Displacement of the contact element which contacts with the work is measured with the scale and the read head. Thereby, the measuring head can perform measurement in a wide range and becomes excellent in the actuation property and the temperature property, and masters for calibration of an indicated dimension are only used at an initial adjustment time.

9 Claims, 22 Drawing Sheets

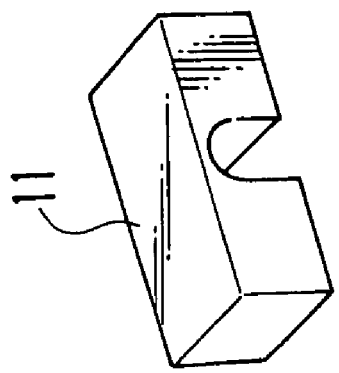
FIG.3(c) ELASTIC SUPPORT POINT
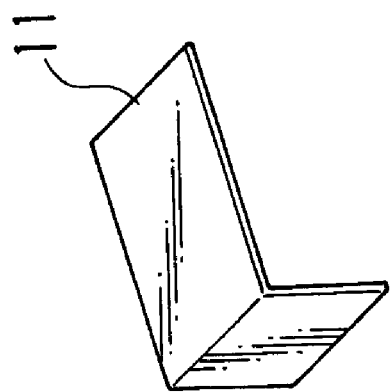
FIG.3(b) L-SHAPED SPRING SUPPORT POINT
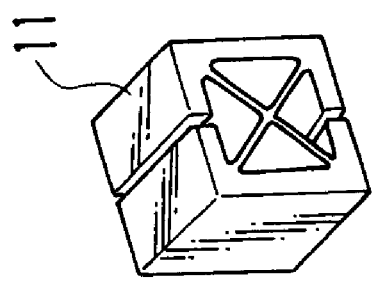
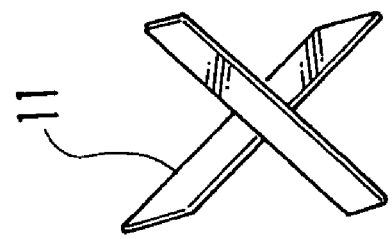
FIG.3(a) CROSS SPRING SUPPORT POINT

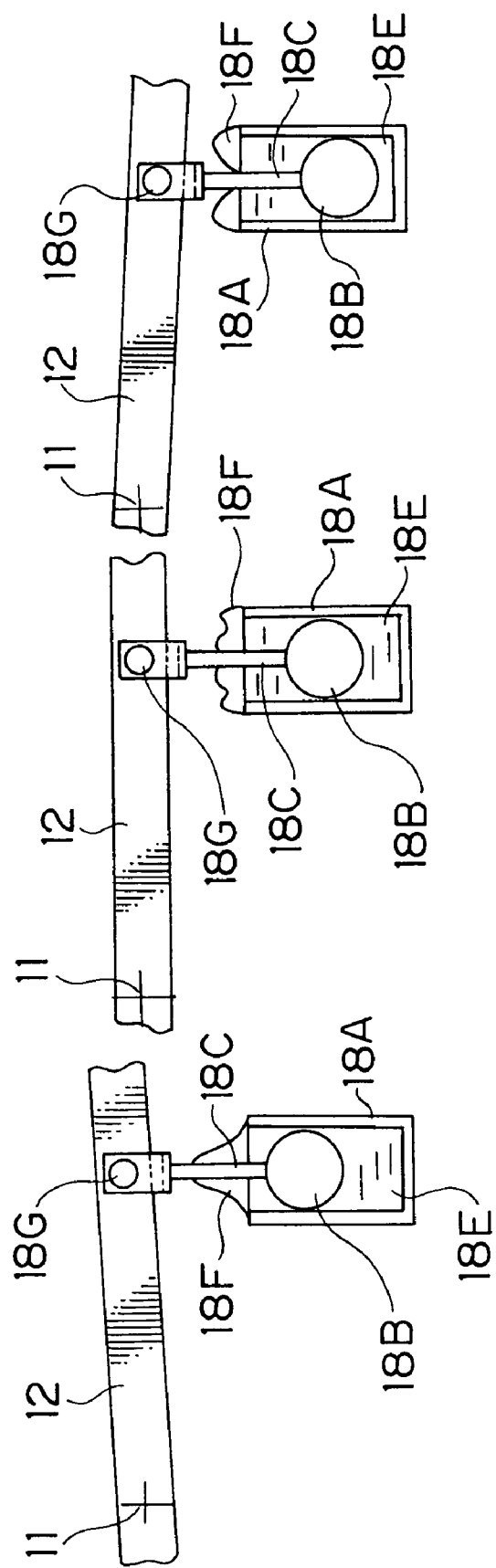

DIGITAL MEASURING HEAD

BACKGROUND OF THE INVENTION

1. Field of the Invention

The present invention relates to a measuring head, and particularly to a seesaw type measuring head which is used in a machine control gauge, a surface roughness, and contour shape measuring apparatus, or the like.

2. Description of the Related Art

A linear voltage differential transducer (LVDT) is conventionally used for a sensor for measuring displacement of a contact element in a seesaw type measuring head used in a machine control gauge, a surface roughness and contour shape measuring apparatus, or the like.

FIG. 22 is a schematic diagram of this conventional measuring head. A measuring head 110 shown in FIG. 22 is a measuring head for measuring an outer diameter, in which two seesaw mechanisms are combined. In the conventional measuring head 110, a moving amount of a contact element 114 supported rotatably around a support point member 111 is measured as a change in voltage in an LVDT 115 provided in a side opposite from the support point member 111. The measurement value of the LVDT 115 is processed in a control unit 140, and obtained as the moving amount.

However, since the conventional measuring head 110 uses the LVDT for the sensor, the following problems exist. Namely, since the linear range of the LVDT is narrow, the measuring range is narrow (generally, about 1 mm) and measurement in a wide range cannot be performed.

Moreover, two of a large master and a small master for calibration are necessary for calibration of indicated dimensions. For example, when a work having a diameter of 30±0.01 mm is measured, a master having a diameter of 30.01 mm (large master) and a master having a diameter of 29.99 mm (small master) are used to adjust sensitivity of the measuring head.

Especially in the case of the measuring head having a size shift function of making it possible to respond to a several kinds of work diameters with one measuring head, the large and small masters are necessary for each dimension to be measured. For example, in the case of the measuring head corresponding to the diameter difference of 20 mm, the zero point can be set at anywhere within the range of 20 mm, but the measurement range is about 1 mm, and therefore when three kinds of works are to be measured, the total of six large and small masters are needed. This is because the linearity of the LVDT differs according to the locations.

Further, setting for measurement takes time due to change of arrangement and a calibration operation by the masters and the like. Since the measuring head is unfavorable in the temperature property and adjustment and inspection for correction thereof take much time, and it takes time until the measuring head is stabilized after the power is turned on, it is unfavorable in actuation property. These are the problems.

In order to solve these problems, a digital measuring head adopting an optical digital mechanism, which moves linearly, is proposed in Japanese Utility Model Application No. 62-078462. However, with the content disclosed therein, a mechanism for converting a moving amount of a contact element supported rotatably around a support point member into a moving amount of linear movement needs to be provided.

However, there exists the problem that the mechanism for converting the rotational movement into the linear movement has a complicated structure, which leads to raise the cost and deteriorates the response frequency due to increase in the mass of a moving portion and friction of the link support point, and therefore it is not applicable to the surface roughness measuring head which is required for high-speed response frequency property.

SUMMARY OF THE INVENTION

The present invention is made in view of these circumstances, and has its objects to provide a digital measuring head which is capable of performing measurement in a wide range, excellent in actuation property, temperature property, and further, response frequency property, and needs only a small number of masters for calibration of indicated dimensions, and to provide a digital measuring head which can be used for both a contour shape measuring apparatus and a surface roughness measuring apparatus due to its capability of measurement in a wide range and excellence in high-speed response frequency property.

In order to attain the aforementioned object, the present invention is directed to a digital measuring head in a measuring apparatus which measures a work by making a contact element abut to the work, the digital measuring head comprising: an arm supported rotatably around a support point arranged on a base; a finger having the contact element at a tip end and mounted to a tip end portion of the arm; and a scale and a read head, one of which is provided at a rear end portion of the arm and the other of which is arranged on the base, wherein displacement of the contact element which contacts with the work is measured with the scale and the read head.

According to the present invention, the displacement of the contact element which contacts with the work is measured with the scale and read head, and therefore the measuring head can perform measurement in a wide range, becomes excellent in the actuation property, temperature property and response frequency property, and in addition, masters for calibration of indicated dimensions may be used only at the initial adjustment time.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIGS. 3(a), 3(b) and 3(c) are perspective views showing support members;

FIGS. 16(*a*), 16(*b*) and 16(*c*) are sectional views explaining a damper of an embodiment of the present invention;

DETAILED DESCRIPTION OF THE PREFERRED EMBODIMENTS

A preferred embodiment of a digital measuring head according to the present invention will be explained in detail below in accordance with the attached drawings.

Figure 1:
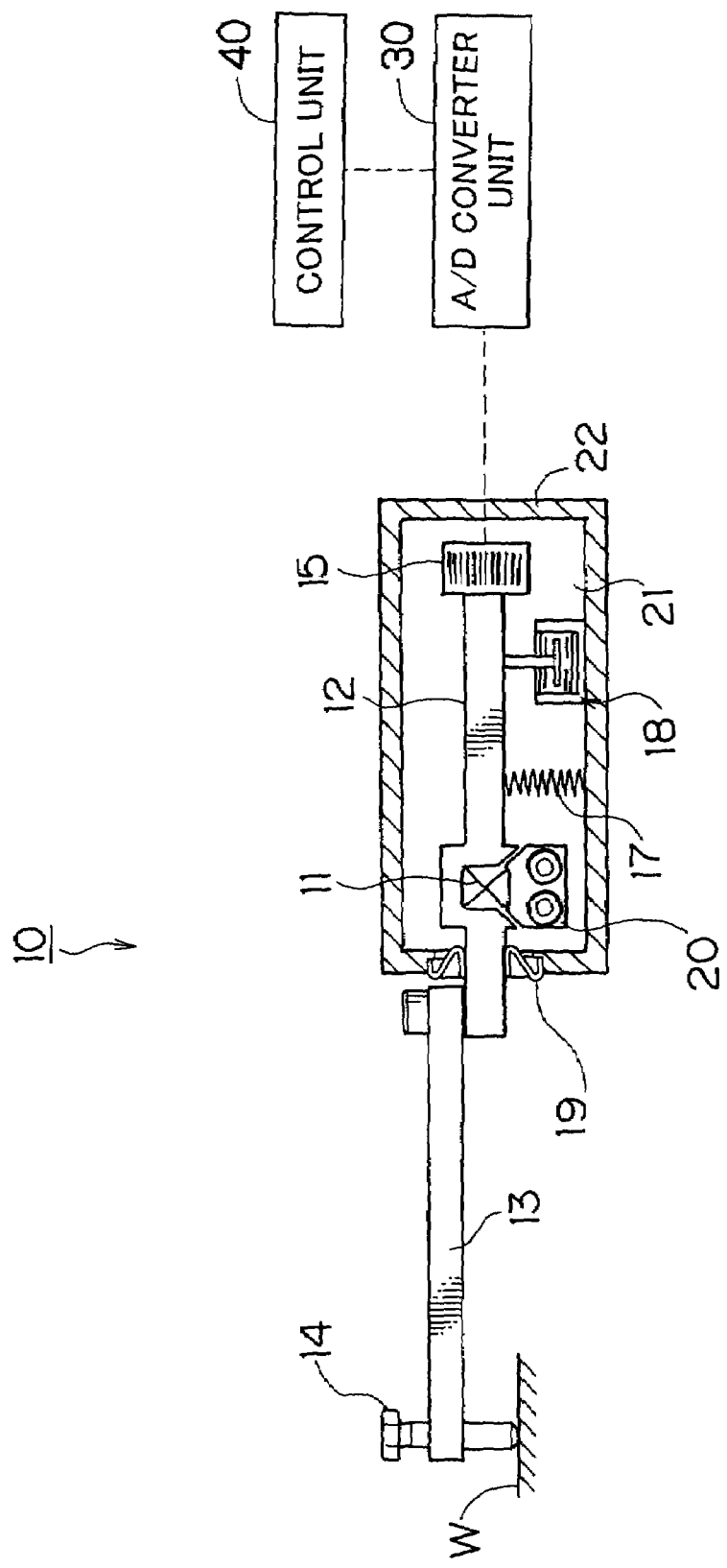
FIG. 1 is a sectional side view showing a digital measuring head according to an embodiment of the present invention.

FIG. 1 is a sectional side view showing a construction of the digital measuring head according to the present invention. A digital measuring head 10 comprises a base 21, a support point member 11, an arm 12, a finger 13, a contact element 14, a scale 15, a read head (not shown), a pressurizing member 17, a damper 18, a boot 19, a case 22 and the like.

The support point member 11 is supported by a holder 20 and attached to the base 21. The arm 12 is held by the support point member 11, and is rotatable in seesaw motion around the support point member 11. The finger 13 is secured at one end of the arm 12 by a screw, and the contact element 14 to abut to a work W is attached to a tip end of the finger 13. The scale 15 as a sensor is attached to the other end of the arm 12. The read head which reads graduations of the scale 15 is fixed to the base 21.

The arm 12 is provided with the pressurizing member 17 for pressing the contact element 14 toward the work W. A compression spring can be used for the pressurizing member, but any member such as a tension spring and the other elastic members may be used if only it can causes a rotational force to the arm 12. Further, the arm 12 is provided with the damper 18, which dampens jumping and vibration of the contact element 14.

The members other than the tip end portion of the arm 12, the finger 13, and the contact element 14 are covered with the case 22. The case 22 has an opening, through which the tip end portion of the arm 12 protrudes. The opening is provided with the boot 19, which prevents dust and mist from entering an inside of the case 22.

Next, an operation of the digital measuring head 10 thus constructed will be explained. First, the digital measuring head 10 is set for the work W. Since the contact element 14 is pressed to the work W by the pressurizing member 17, the contact element 14 is rotationally displaced around the support point member 11 correspondingly to the size of the work W. When the contact element 14 is rotationally displaced, the scale 15 attached to the arm 12 is also rotationally displaced. The displacement amount of the scale 15 is measured with the read head, processed in an A/D converter unit 30, and sent to a control unit 40, whereby the size of the work W is obtained.

Since the arm 12 is provided with the damper 18, jumping and vibration of the contact element 14 are prevented. Since the boot 19 is attached to the opening of the case 22, a processing solution, mist, dust and the like never enter the case 22.

Figure 2:
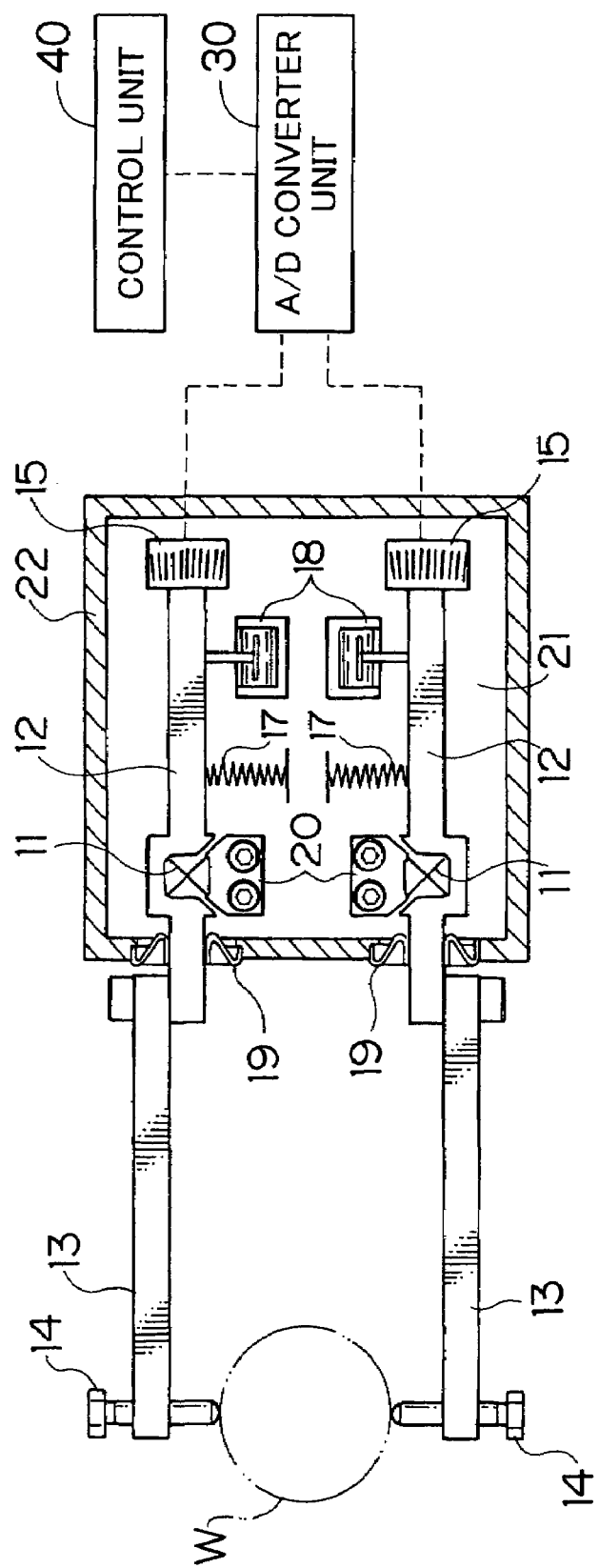
FIG. 2 is a sectional side view showing a Σ type measuring head for measurement of an outer diameter.

The digital measuring head 10 shown in FIG. 1 is the measuring head for measuring thickness and elevation change, a contour shape, and surface condition (hereinafter referred to as a Γ type measuring head). On the other hand, the digital measuring head 10 shown in FIG. 2 is a measuring head which is made by combining two of the structures shown in FIG. 1 to be symmetrical to measure an outer diameter of the work W. As for this measuring head, other than the outer diameter measuring head shown in FIG. 2, there is an inner diameter measuring head in which the contact elements 14 are attached in the reverse directions, and the pressurizing directions of the pressurizing members 17 are reversed. The operations of the outer diameter measuring head and the inner diameter measuring head (hereinafter, referred to as the Σ type measuring head) are basically the same as the Γ type measuring head shown in FIG. 1, and therefore the explanation will be omitted.

Next, each component will be explained in more detail. A main body structure of the digital measuring head 10 is such that all of the main components other than the finger 13 and the contact element 14 are mounted on the base 21 to be one unit and thereafter the unit is mounted to the case 22. The base 21 is made of the same material as the work W or made of the material with the same thermal expansion coefficient as the work W, whereby the measuring head excellent in temperature property is provided. This is because the work W expands or contracts if the ambient temperature changes. If the linear expansion coefficients are the same between the base 21 and the work W, the base 21 expands and contracts with the fixed screw portion as the base point as the work W, and therefore the measurement error can be made small. Even with use of the same material, if each component is fixed to different locations of the case 22, the change amount differs in accordance with the locations, and therefore a large error occurs. The Σ type measuring head has the symmetrical structure which is resistant to the influence of heat as shown in FIG. 2.

A cross spring support point as shown in FIG. 3(*a*) is used for the support point member 11. As the cross spring support, there is the construction in which two leaf springs are aligned in such a manner as to cross each other as shown in the illustration on the left-hand side of FIG. 3(*a*), but in this embodiment, the integrated one by cutting by wire cut machining as shown in the illustration on the right-hand side of FIG. 3(*a*) is used. This integrated cross spring support point has high rigidity and favorable repeatability though with high processing cost, and therefore this is suitable for the support point with high precision.

As the support point member 11 other than those describe above, an L-shaped spring support point shown in FIG. 3(*b*), an elastic support point shown in FIG. 3(*c*), a bearing or pivot support point and the like can be used. The L-shaped spring support point is inferior to the cross spring in precision but is less expensive, and is the support point commonly used widely. However, it has the disadvantage that the support point center moves following the rotating movement, and though it is at a level which does not matter when the LVDT is used for the sensor, it causes an error which cannot be ignored when the sensor is a scale. For this reason, the relation between the rotating movement and the moving amount of the support point center is found by calculation, and correction is made by software.

The elastic support point has high precision but can take only a small rotation angle, and therefore it can be used at low cost when the measurement range is narrow. The bearing support point has no limitation on the rotation angle, but reduces in precision due to abrasion, and therefore it needs to be replaced periodically.

The finger 13 is formed to be separate from the arm 12 and fixed to the arm 12 with the screw so that it can be replaced correspondingly to the shapes of works, but it may be integrated with the arm 12. Stainless steel is used as the material of the finger 13, but iron with rust prevention plating being applied, ceramics, and the like may be used. As for the sectional shape, the finger 13 has the circular section to reduce influence of pressure of coolant on measurement, because the coolant splashes on the finger 13 when the work W which is worked while the coolant is applied to it is measured. However, the sectional shape is not limited to a circular shape, and a square shape, an oval shape and the like may be used.

As for the contact element 14, the screw type contact element 14 is used so that fine adjustment in the height direction can be performed as shown in FIGS. 1 and 2. Another construction may be used in which the contact element 14 is directly embedded in the finger 13 and adjustment in the height direction is performed at a mounting portion of the finger. In the case of Γ type measuring head, adjustment in the height direction can be performed by moving the entire measuring head.

Super steel or diamond is embedded in a tip end portion of the contact element 14 which contacts the work W. Since the tip end portion needs to be strong against abrasion, and super steel, diamond, ruby and the like are generally used, and they are properly used in accordance with the material of the work W.

When a hard material such as iron and stainless steel is measured, inexpensive super steel is used, but when rotating work W is measured, diamond which is stronger against abrasion is used. When a soft material such as aluminum, copper, and soft glass is measured, diamond which slides smoothly is used, so that a damage and a dent are prevented from occurring by reducing a measuring force, and reducing the falling speed from a retracted state.

A round shape is usually used for the tip end shape of the contact element 14. A radius of curvature of the round shape is not limited, but especially when the work W which is under working in process is measured, the tip end shape with the small radius of curvature of about 0.5 mm to 1.5 mm is used so as not to catch chips.

When the measured surface is rough, the value may be varied as a result of catching fine roughness, and therefore the tip end shape with a large radius of curvature for the purpose of equalization is used. In this case, the tip end having the radius of curvature of around 3 mm to 6 mm is normally used. In the case of the soft work W, the tip end having the radius of curvature of 3 mm or more is used for the purpose of reducing the dent of the work W at the time of contact, and the tip end having the radius of curvature of about 3 mm to 6 mm is typically used.

Figure 4:
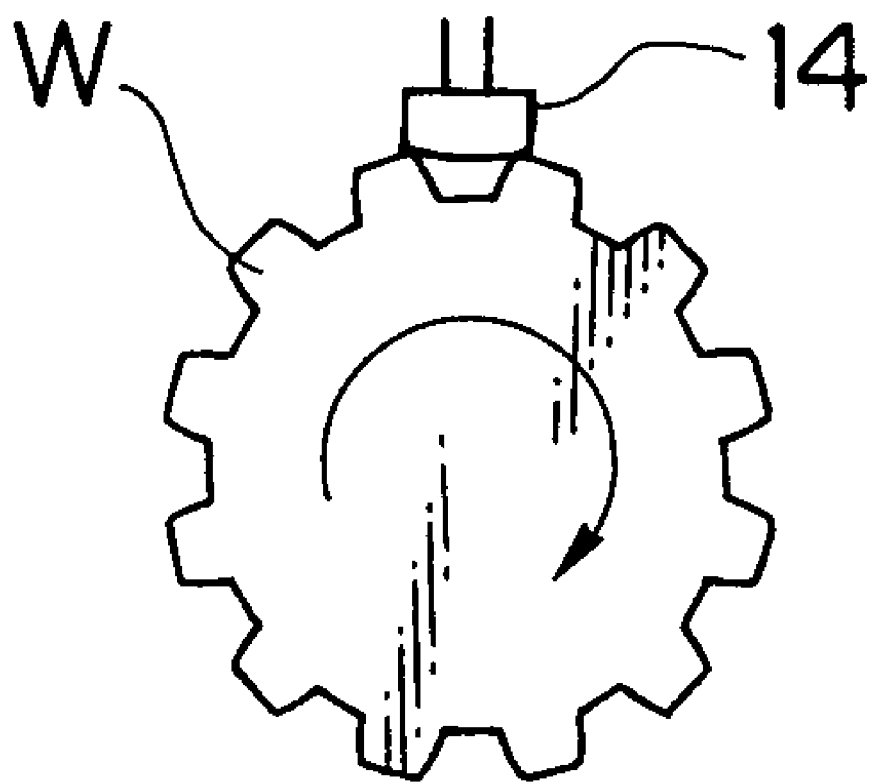
FIG. 4 is a schematic diagram explaining measurement of a gearwheel.

When a discontinuous surface such as a gearwheel is measured, the tip end having the radius of curvature in the size to stride a groove is used as shown in FIG. 4, the radius of curvature in the parallel direction with the groove is made about 1.5 mm, and the contact element 14 in a boat shape as a whole is used.

When an outer diameter of a rotating gearwheel is measured, the measurement value is varied due to the amounts of falling and jumping being large if the small contact element 14 is used, and therefore the structure, which can ride on peak from valley favorably, needs to be adopted. Even with the structure of striding the groove, falling and jumping cannot be constrained completely. Thus when the rotation increases in speed, larger rattles are caused, or the tip end kept jumping up, and the tip end hardly contacts the gearwheel. Consequently, it is necessary to increase the effect of the damper 18 and control the circumferential speed of the work W and the contacting and non-contacting time. For measurement, the method for rotating the work W one round or more and memorizing the maximum value is used.

Other than the above, the cylindrical super steel contact element 14 may be used. In this case, a split is provided in a contact element insertion hole of the finger 13, and the contact element is fixed by split clamping. When the contacting portion with the work W is worn, it is rotated and fixed again so that the unused surface is used, whereby the service life is extended. However, this circular contact element 14 is difficult to be positioned in parallel with the work W, and therefore this is used under the special condition such as in the case in which the space is so narrow that the round-shaped type contact element cannot be used.

In the case of the contour shape measuring apparatus, the radius of curvature of the tip end of the contact element 14 is usually from 0.01 mm to 1.0 mm, and in the case of the surface roughness measuring apparatus, it is usually from 0.002 mm to 0.010 mm.

Figure 5:
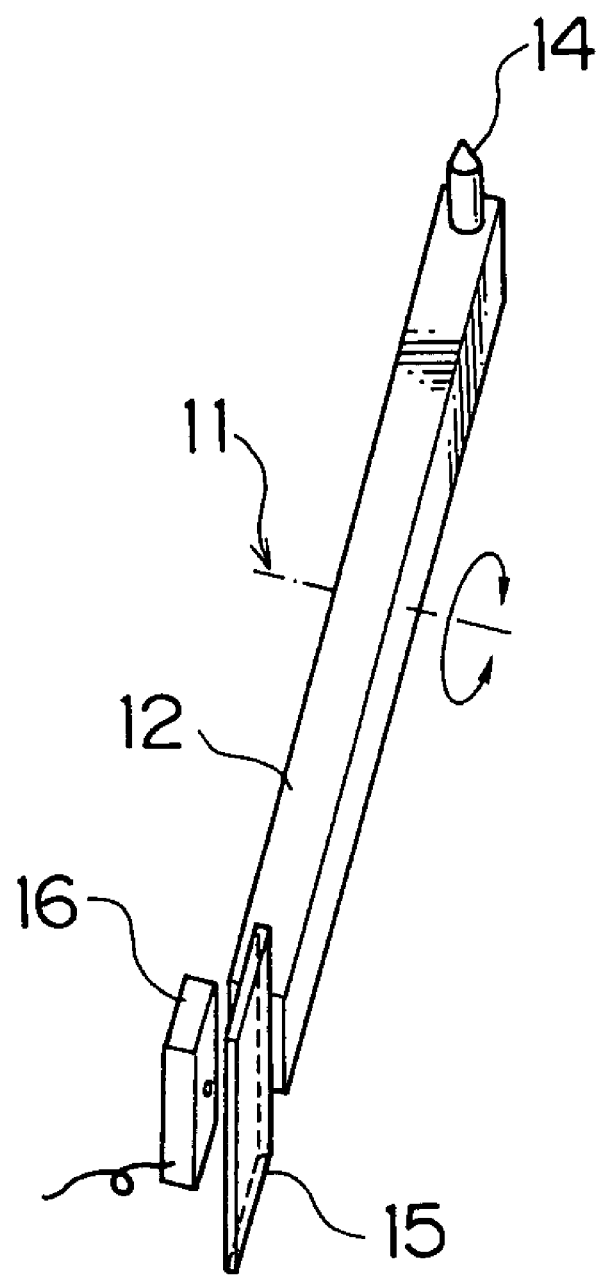
FIG. 5 is a perspective view showing a refraction interference type scale unit.

FIG. 5 is a perspective view explaining a construction of the scale section. The scale section is constructed by the scale 15 and the read head 16 as shown in FIG. 5. The reflection type scale utilizing refraction interference of light is used for the scale 15, which is fixed to the arm 12 rotating around the support point member 11. The read head 16 is placed in the vicinity of the scale 15 to measure the moving amount of the scale 15. The read head 16 is constituted of a light emitting element as a light source (not shown), a collimate lens or a condensing lens, and a light receiving element as a light receiving device.

Figure 6:
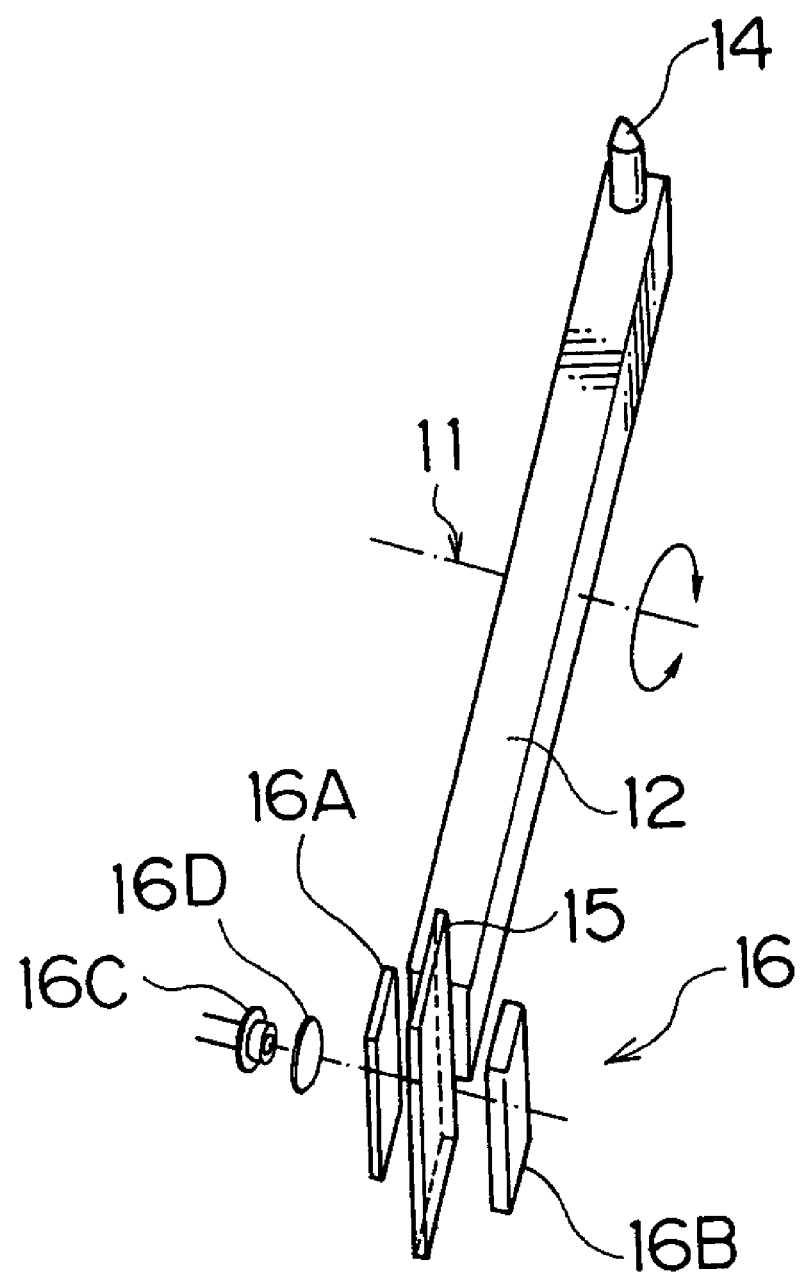
FIG. 6 is a perspective view showing a moire scale unit.

FIG. 6 is a perspective view showing a construction in the case of using a transmission type moire scale is used for the scale 15. In the case of the transmission type moire scale, the scale 15 fixed to the arm 12 is the main scale, and the read head 16 is constituted of an index scale 16A placed close to the main scale, a light emitting element 16C as a light source, a collimate lens 16D, and a light receiving element 16B as a light receiving device.

In the aforementioned embodiment, the reflection type scale and the transmission type moire scale are shown as the scale 15, but the present invention is not limited to them, and various kinds of scales such as a transmission type scale utilizing refraction interference, a reflection type moire scale or the like.

Figure 7B:
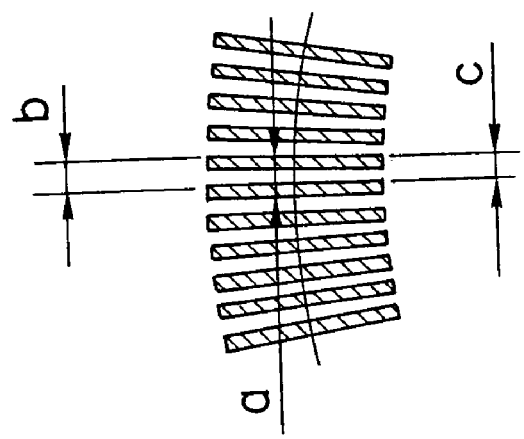
FIGS. 7(a) and 7(b) are schematic diagrams explaining an arc pattern scale.
Figure 7A:
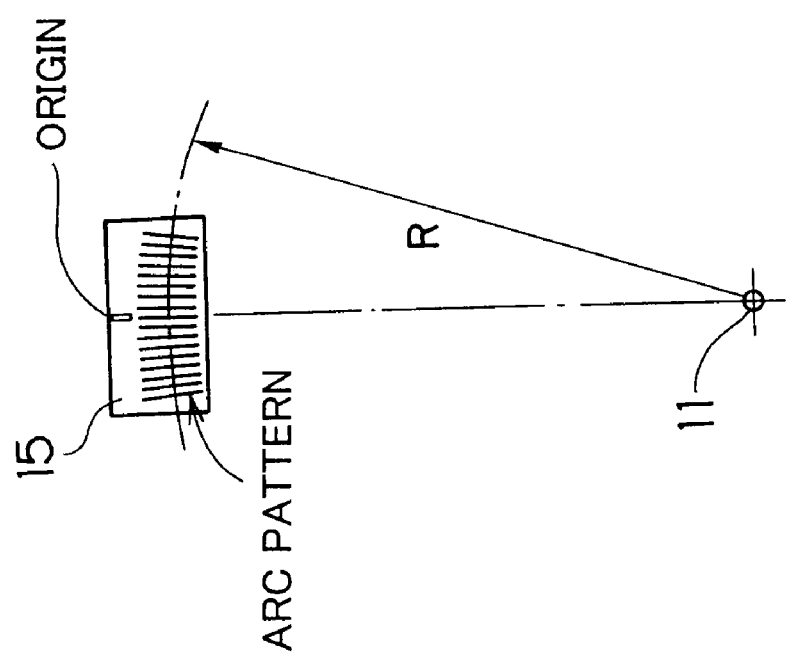
Figure 8:
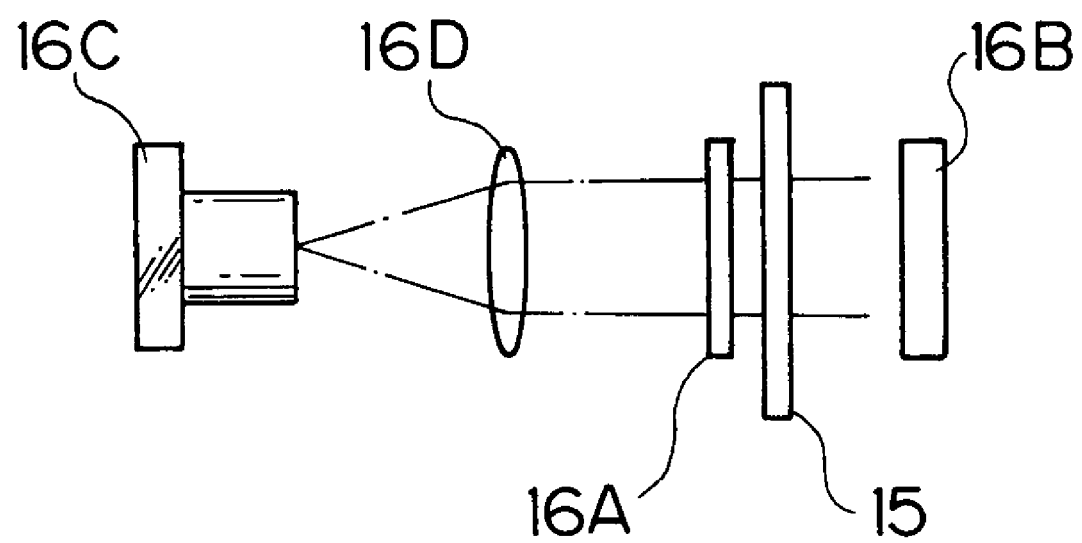
FIG. 8 is a block diagram showing a moire scale unit.

The scale pattern is formed to be a circular arc shape in either method, in either case of the reflection type scale or of the transmission type scale. Therefore, as shown in FIG. 7(*a*), the scale 15 is placed so that the center of the arc of the read point and the center of the support point member, which is the center of rotation of the arm 12, correspond to each other. If this positioning is out of the alignment, an eccentric error occurs, and therefore accurate adjustment is made.

Since the scale pattern is in an arc shape, the pattern pitch differs in accordance with the read positions. FIG. 7(*b*) is an enlarged view of the arc pattern of the scale 15, and as shown in the same drawing, the pattern pitches differ as a, b, and c in accordance with the positions in the radius direction. Consequently, it is designed that the desired pitch is obtained at the read position.

As for an origin on reading the scale 15, a mechanical origin such as a limit switch may be provided, but the origin is provided on the scale as shown in FIG. 7(*a*) in this embodiment. As for the origin on the scale, the method for forming one slit on the scale and optically measuring whether this slit passes or not is adopted, but instead of the slit, a pattern may be formed. When a count error occurs due to noise or the like, zero setting has to be redone using a master in the scale 15 in which the origin is not formed, but in the case with the origin being formed, resetting is done by making the slit pass the origin once.

In the aforementioned embodiment, the read head 16 is fixed and the scale 15 is rotationally moves, but the present invention is not limited to this, and the scale 15 may be fixed and the read head 16 may be rotationally moved. In this case, some device is needed in wiring of a signal line from the read head 16.

In the moire scale method, light emitted from LED that is the light emitting element 16C is made parallel light beams at the collimate lens 16D to illuminate the index scale 16A and the scale 15 that is the main scale. Moire fringes occurring by combination of the index scale 16A and the scale 15 that is the main scale is read by a photodiode that is the light receiving element 16B.

Figure 9:
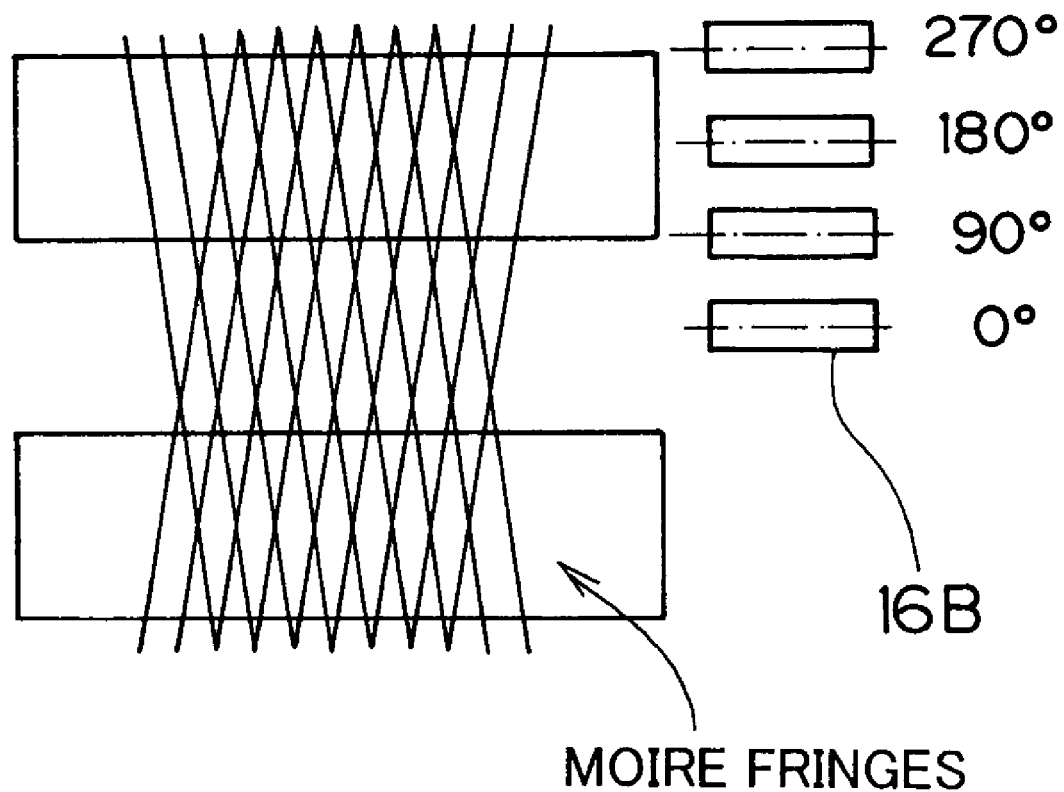
FIG. 9 is a schematic diagram explaining read of moire fringes.

FIG. 9 is an explanatory view of the case of a linear type moire scale. The moire fringes occur by tilting the index scale 16A with respect to the main scale. The pitches of the moire fringes depend on the pitch of the pattern and the tilt angle between both scales. Four photodiodes are used and the positional relationship between the moire fringes and the photodiodes is adjusted so that four phase signals of 0°, 90°, 180° and 270° can be obtained from the moire fringes. The number of the photodiodes is not limited to four, and for example, 24 of photodiodes may be used, and six groups of signals each obtaining four phase signals may be averaged.

Figure 10:
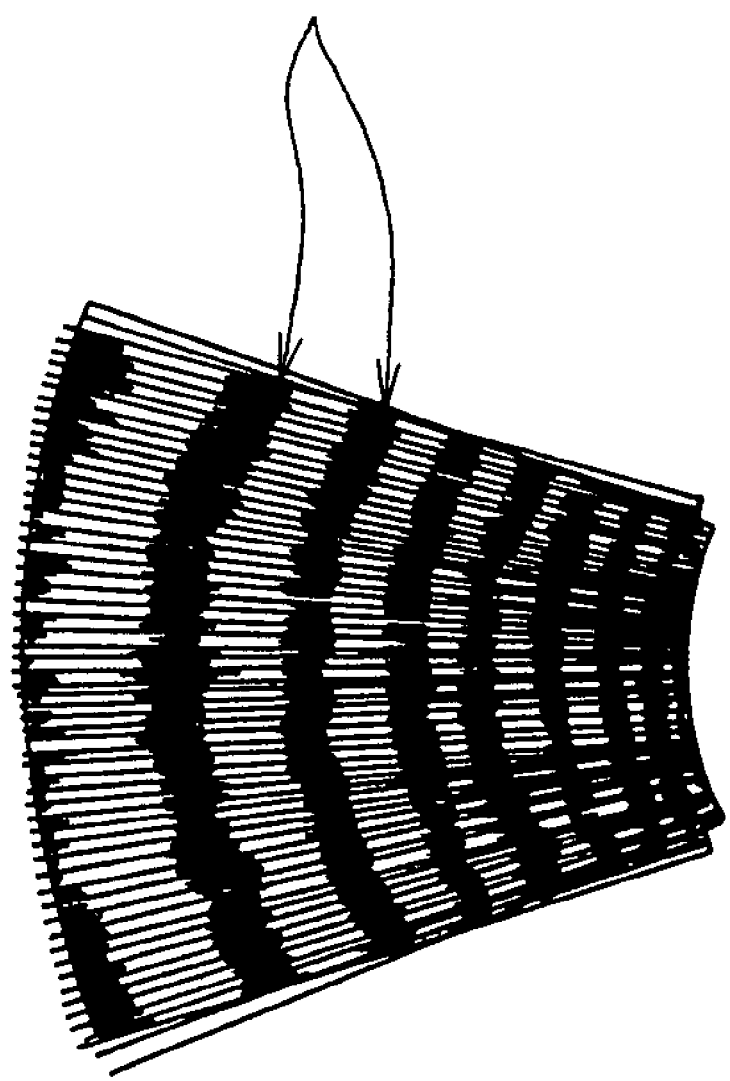
FIG. 10 is a plan view showing the moire fringes.

In the case of the arc scale, the patterns of the main scale and the index scale 16A are formed to be the same, and both of them are placed to tilt, whereby arc moire fringes occur in the perpendicular direction to the pattern as shown in FIG. 10. When the main scale and the index scale 16A having the same arc patterns are displaced in the radius direction to be placed, the moire fringes occur in the parallel direction with the pattern. When the patterns of the main and index are formed to be the different patterns in the pattern pitches or arc radiuses, and are displaced in the radius direction similarly, the moire fringes parallel with the patterns also occur.

Figure 11:
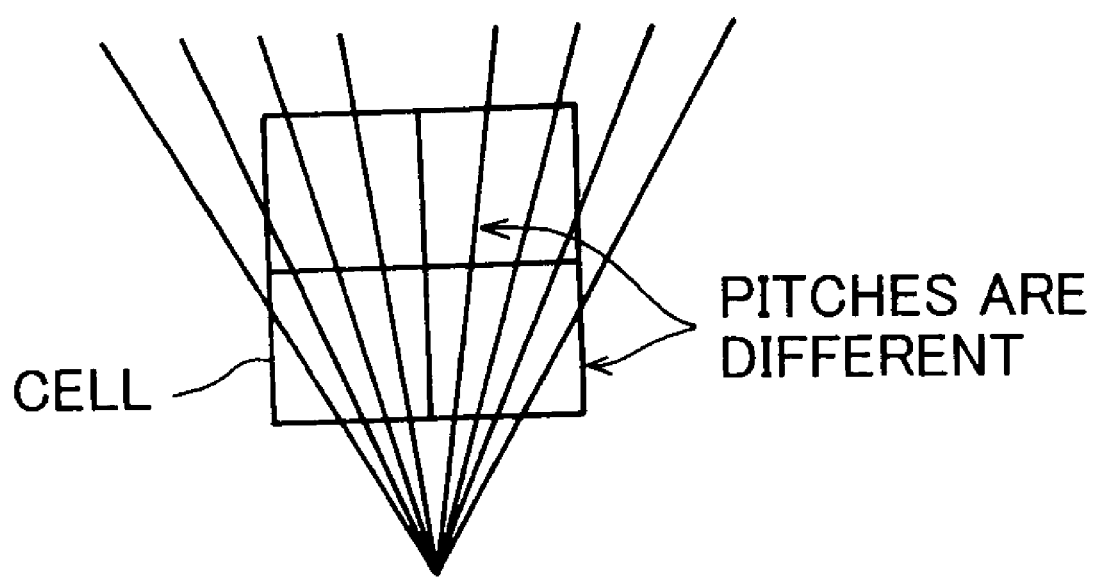
FIG. 11 is a schematic diagram explaining a null fringe type scale.

Other than the aforementioned method, in the linear type, there is the method in which a plurality of grids with different phases are formed on the index scale 16A, a null fringe type in which the entire position of the phase changes to bright and dark according to the combination with the main scale for each phase is constructed, and photo diode cells are placed behind the respective grids displaced in phase. When the null fringe type is applied to the arc scale, it is necessary to form the patterns at a plurality of positions of the index scale 16A with different arc radiuses by displacing them in phase, and therefore the patterns are formed by changing the pitches as well as the phases in accordance with the positions with different arc radiuses as shown in FIG. 11.

Figure 12:
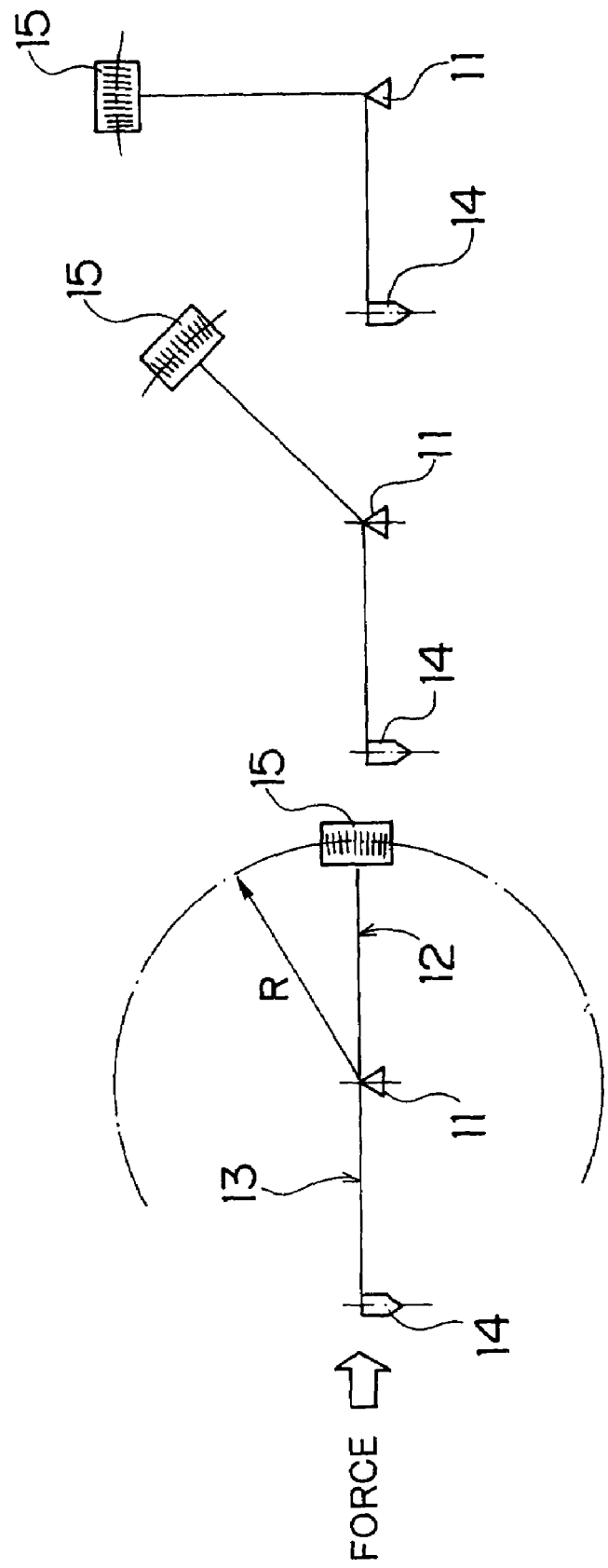
FIGS. 12(*a*), 12(*b*) and 12(*c*) are schematic diagrams explaining placement of a scale.

FIGS. 12(*a*), 12(*b*) and 12(*c*) show examples of three kinds of mounting positions of the scale 15. FIG. 12(*a*) shows the case in which the scale 15 is provided on the same straight line as the finger 13, FIG. 12(*b*) shows the case in which it is provided in a direction at 45° with respect to the finger 13, and FIG. 12(*c*) shows the case in which it is provided in the orthogonal direction to the finger 13. The mounting position of the scale 15 may be at any angle if only the center of rotation of the support point member 11 corresponds to the center of the arc of the arc pattern of the scale 15, and the arm 12 and the finger 13 may be in any shape in their middle portions. However, when a force from the arrow direction as in FIG. 12(*a*) is applied to the contact element 14, it hardly causes an error in FIG. 12(*a*), but it directly leads to a reading error in FIG. 12(*c*).

Figure 13:
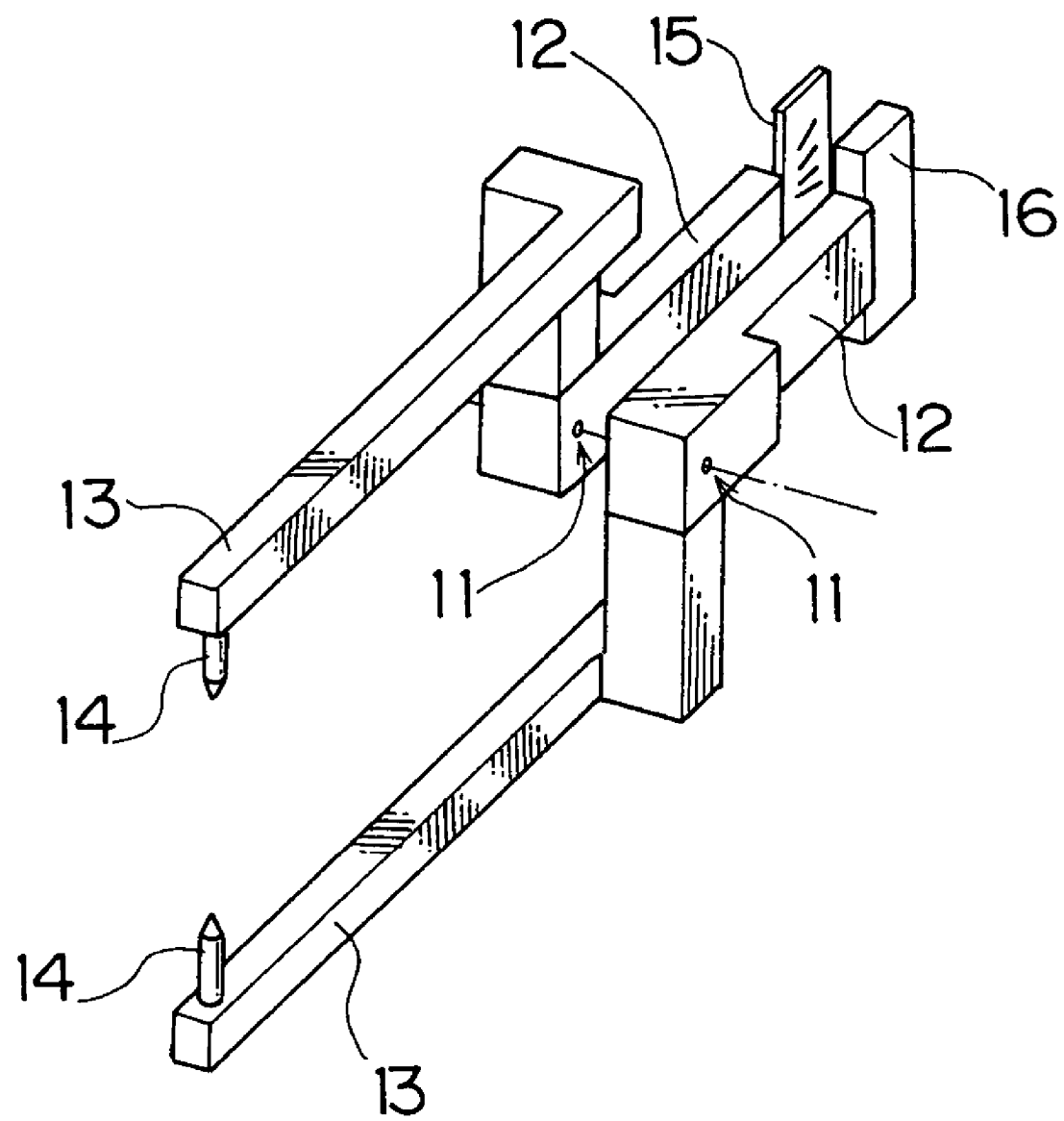
FIG. 13 is a perspective view showing a modified example of the embodiment of the present invention.
Figure 14:
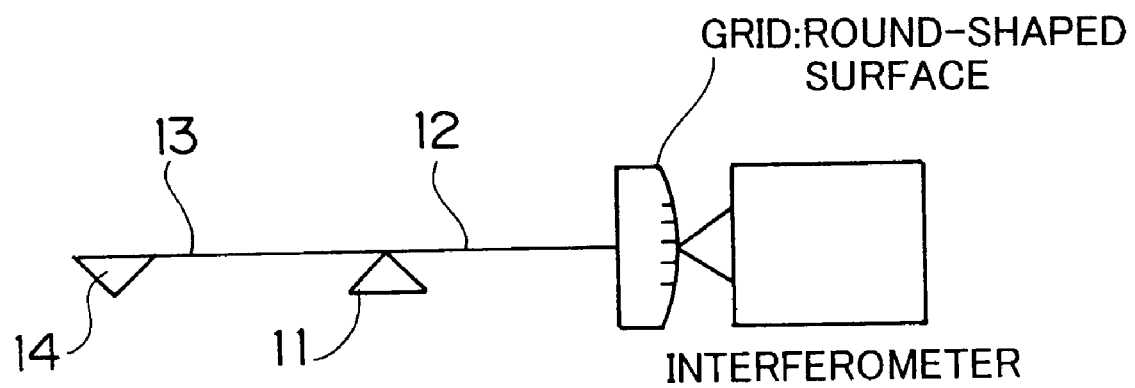
FIG. 14 is a schematic view showing another modified example of the present invention.

FIG. 13 shows the case in which one scale unit is shared in the Σ type measuring head. In this embodiment, the scale 15 is mounted to the arm 12 for the upper contact element 14, and the read head 16 is mounted to the arm 12 for the lower contact element 14, as shown in FIG. 14. The support members 11 and 11 of both the arms 12 and 12 are placed so that the centers of rotation are positioned on the same straight line. The construction in this case has not only the merit that construction is made at low cost with use of only one set of scale unit, but also the merit that reading resolution is doubled.

The above-described construction includes a modified example applied to the inner diameter measuring head in which the directions of the contact elements 14 and 14 are reversed and the directions in which the measuring pressure is applied are reversed.

As a modified example of the placement structure of the scale unit, there are the method in which a grid is formed on a member having a round-shaped surface provided at a rear end of the arm 12, and the method in which a tape scale is adhered to the round-shaped surface and an interferometer is placed at a position opposing to the round-shaped surface, as shown in FIG. 14. In the case of the modified examples, the thickness of the entire measurement head can be made smaller, but the size in the longitudinal direction increases.

Figures 15A, 15B:
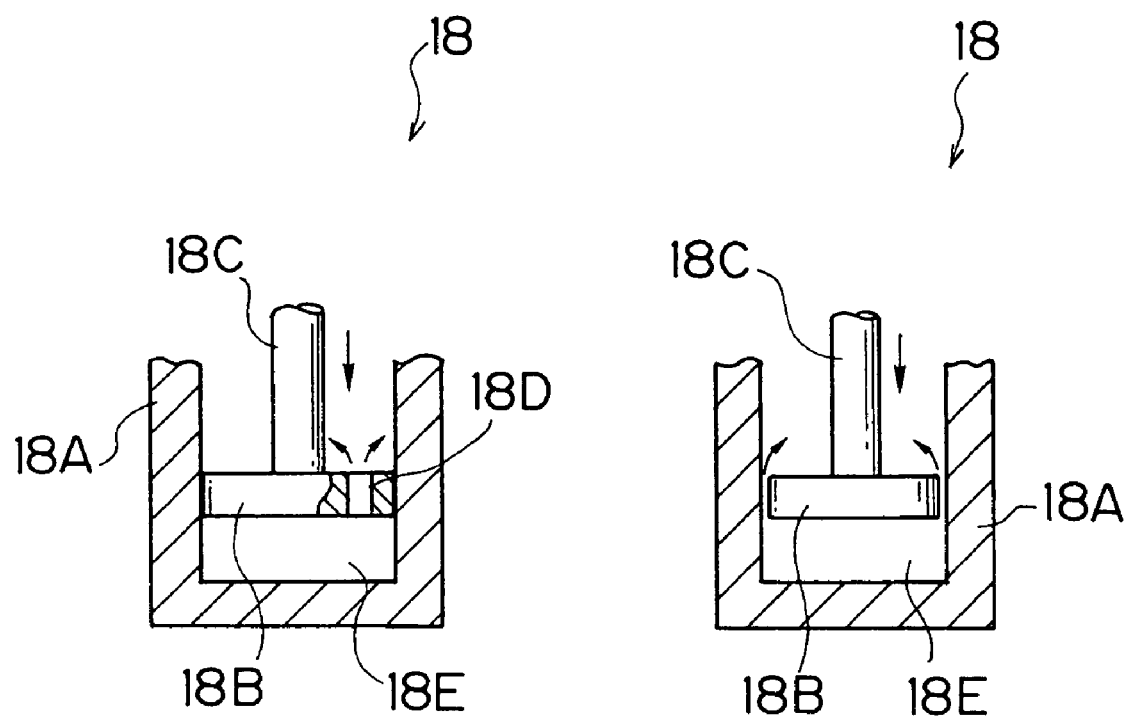
FIGS. 15(*a*) and 15(*b*) are sectional views explaining principles of a damper.

FIGS. 15(*a*) and 15(*b*) are sectional views showing principles of the damper 18. The damper 18 is for damping the jump of the contact element 14 when the work is rotated, and is especially necessary when a discontinuous surface such as a gearwheel is measured. The damper 18 is a dash pot type damper, and a piston 18B attached to a shaft 18C performs piston movement inside a cylinder 18A filled with a damper material 18E. Pressure difference occurs at both sides of the piston 18B based on resistance of a channel when the damper material 18E passes through the narrow channel following the movement of the cylinder 18A, and the pressure difference works on the piston surface and gives resistance to the piston movement. FIG. 15(*a*) shows the case in which a hole 18D formed in the piston 18B becomes the channel, and FIG. 15(*b*) shows a case in which clearances between the piston 18B and the cylinder 18A become the channels.

FIGS. 16(*a*), 16(*b*) and 16(*c*) are sectional side views explaining the damper 18 in this embodiment. The damper 18 is constituted of the cylinder 18A, the piston 18B, the shaft 18C, the damper material 18E, a boot 18F, a hinge pin 18G and the like, as shown in FIGS. 16(*a*), 16(*b*) and 16(*c*). The cylinder 18A is in a cylindrical shape, and silicone oil is filled inside the cylinder 18A as the damper material 18E. The piston 18B has a spherical body with a slightly smaller diameter than an inner diameter of the cylinder 18A, is connected to one end of the shaft 18C and reciprocates inside the cylinder 18A.

The other end of the shaft 18C is rotatably connected to the arm 12 via the hinge pin 18G. The boot 18F is attached to an upper portion of the cylinder 18A, so that the damper material 18E filled inside does not leak out. The damper material 18E is not limited to silicone oil, but may be water, engine oil, or the like, or may be air. In the case in which the damping effect is intended to increase, the material with high viscosity is used.

The shaft 18C is rotatably connected to the arm 12 via the hinge pin 18G, but since the piston 18B has a spherical body, the damping effect can be obtained even if the hinge pin 18G is omitted and the shaft 18C is fixed to the arm 12 in the case of the measuring head with fewer measuring strokes.

FIG. 16(a) shows a state in which the arm 12 is raised at its right side, FIG. 16(b) shows the arm 12 in a horizontal state, and FIG. 16(c) shows a state in which the arm 12 is lowered at its right side. As shown in the drawings, a change in volume following coming and going of the shaft 18C is absorbed by expansion and contraction of the boot 18F.

Figure 17:
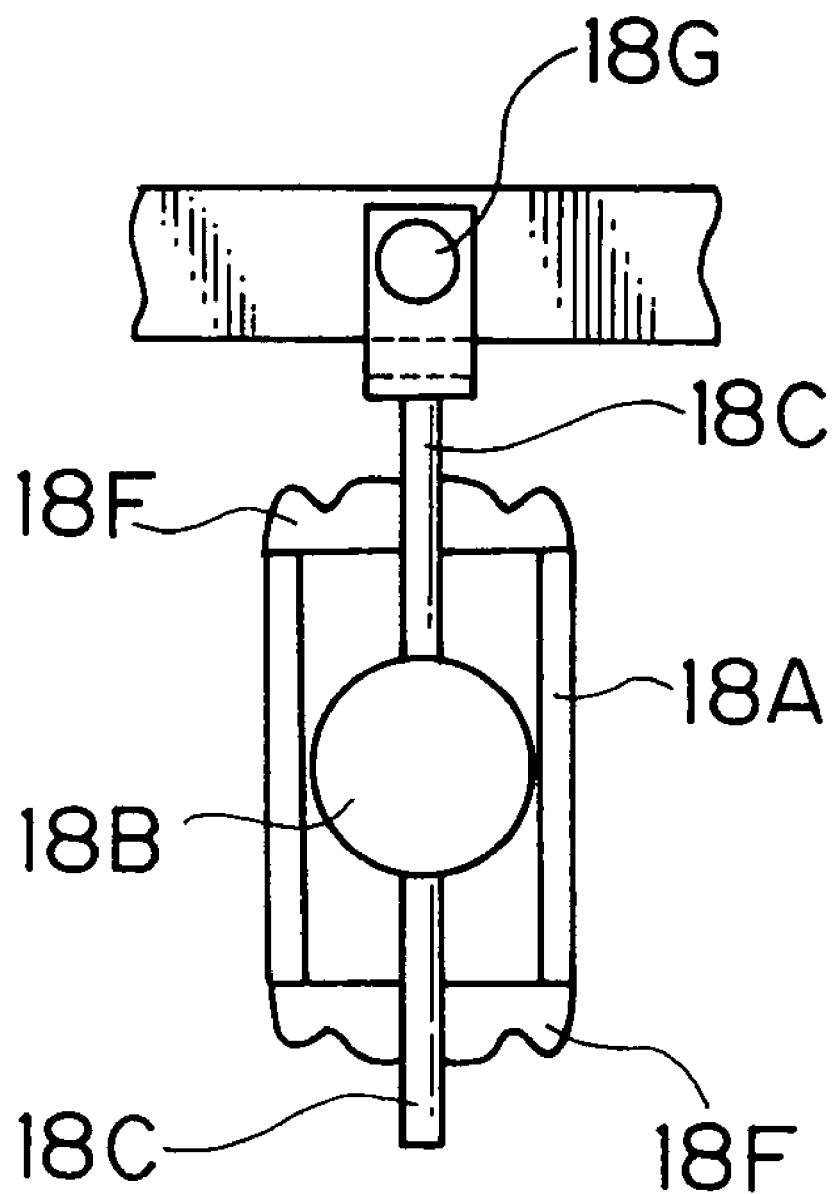
FIG. 17 is a sectional view explaining a modified example of the damper.

FIG. 17 shows a modified example of the damper 18. In this modified example, the shafts 18C and 18C with the same diameters are provided at both sides of the spherical piston 18B, and the boots 18F are attached at both sides. According to this modified example, by the amount by which the shaft 18C is pushed in, the shaft 18C at the opposite side sticks out, or by the amount by which the shaft 18C is pulled out, the shaft 18C at the opposite side goes in, and therefore there is no volume change and no need that the boots 18F expands and contract, thus increasing durability of the boot 18F.

In order to realize a subtle damping effect, it is necessary to consider a cavitation phenomenon. This is the phenomenon in which bubbles and voids occur when the portions at low pressure are formed in a flow, and the phenomenon occurs when the viscosity of fluid, the clearance and the speed satisfy a certain condition. This phenomenon is the most likely to occur in the case with high viscosity and narrow clearance at high speed, and it becomes a hindrance when the damping effect is desired to be high and correspond to the abrupt displacement of the contact element 14.

Figure 18A:
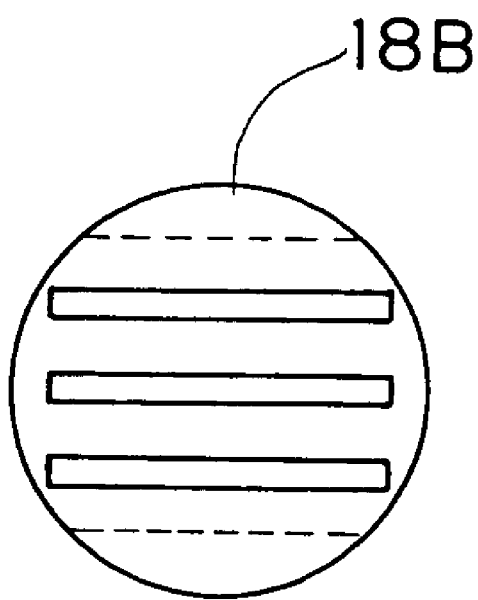
FIGS. 18(*a*) and 18(*b*) are schematic views explaining a modified example of a piston.
Figure 18B:
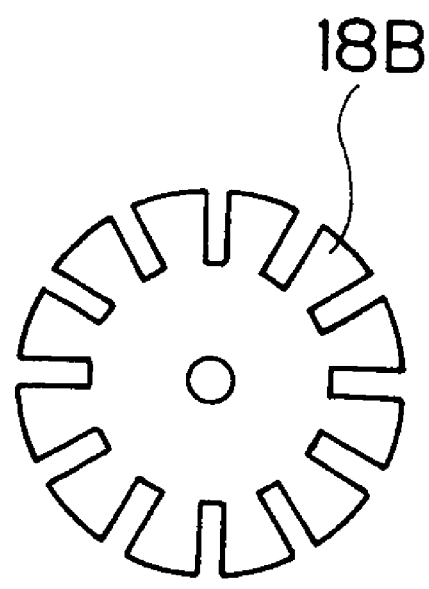

FIGS. 18(a) and 18(b) show a state in which a plurality of grooves are radially formed on a surface of the spherical piston 18B, and is the modified example in which the aforementioned cavitation phenomenon is prevented from occurring. FIG. 18(a) is a side view, and FIG. 18(b) is a plan view. In this case, the diameter of the spherical piston 18B is made slightly small to widen the clearance, and increase viscosity resistance by the grooves by that amount. However, the resistance force by the viscosity resistance is much smaller as compared with the resistance force by the clearance, and therefore the viscosity of the damper material 18E is made high.

In the above-described embodiment, the piston 18B is made spherical, but the shape in which the top and bottom of the sphere are sliced and only the side surface is made a spherical surface may be adopted, or a barrel shape may be adopted, and various kinds of shapes may be used if only they are the shapes capable of corresponding to the tilt of the shaft 18C.

Figure 19:
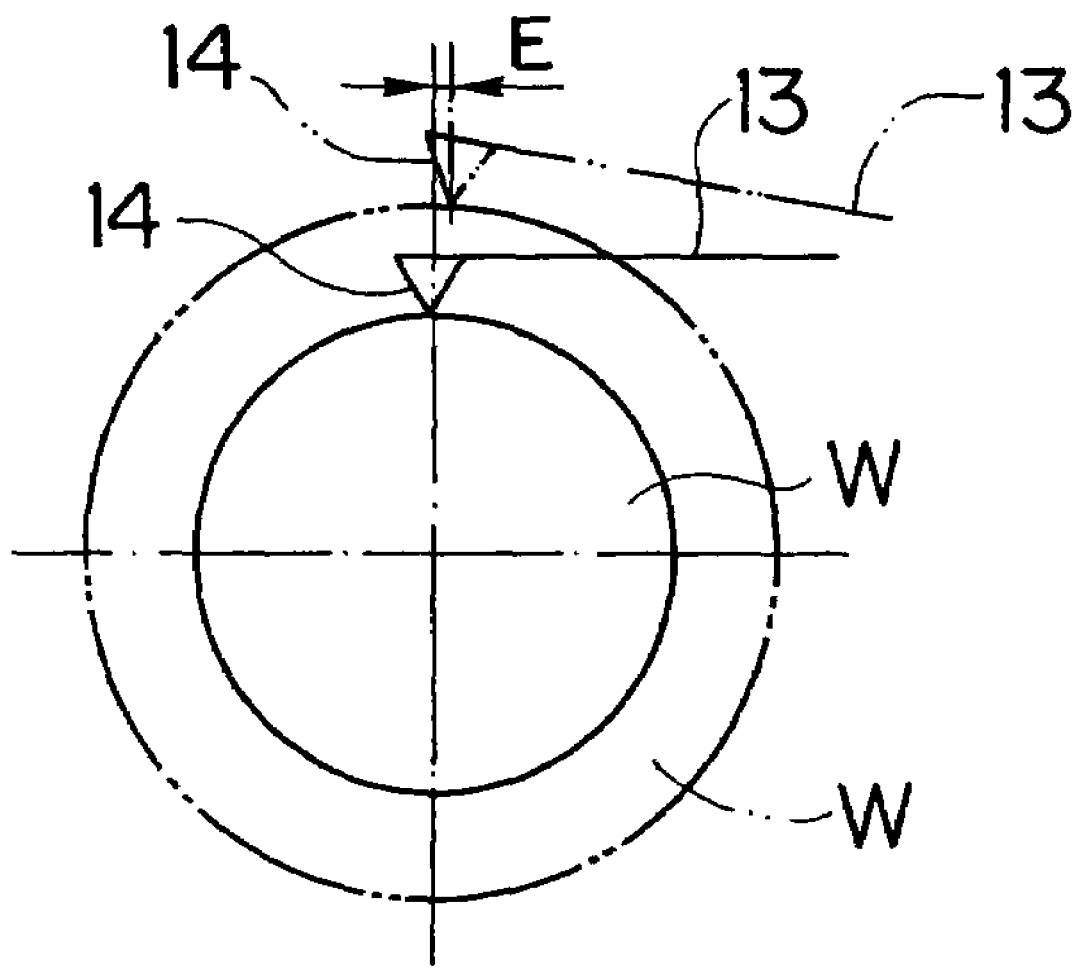
FIG. 19 is a schematic diagram explaining an arc error.

The correction of an arc error which matters in the seesaw type measuring head will be explained. By using the scale 15 for the sensor, wide-range measurement is made possible, but for example, in the outer diameter measurement, following the arc movement of the contact element 14, a contact point of the contact element 14 with the work W is deviated from an axis of the work W by E as shown in FIG. 19. If the deviation is changed linearly from the minimum diameter of the work W to the maximum diameter, calibration may be made with two masters with the minimum diameter and the maximum diameter, but it is actually changed in a cubic equation curve form, the correction is made with software. The locus of the contact point of the contact element 14 with the work W is calculated from the positional relationship of the support point of the arm 12 and the work W, and an error of each measured diameter with a scale zero point as a reference is calculated and corrected.

Figure 20:
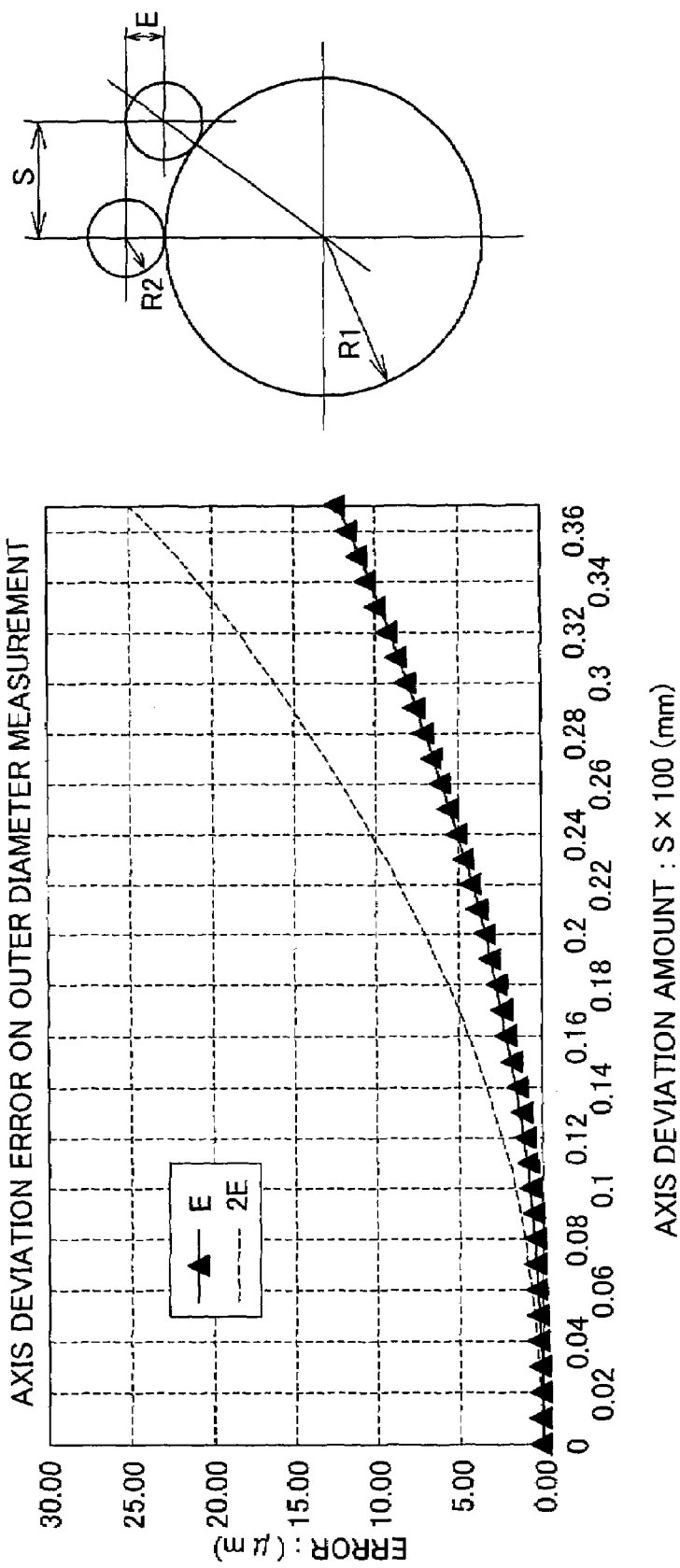
FIG. 20 is a graph explaining an axis deviation error.
Figure 21:
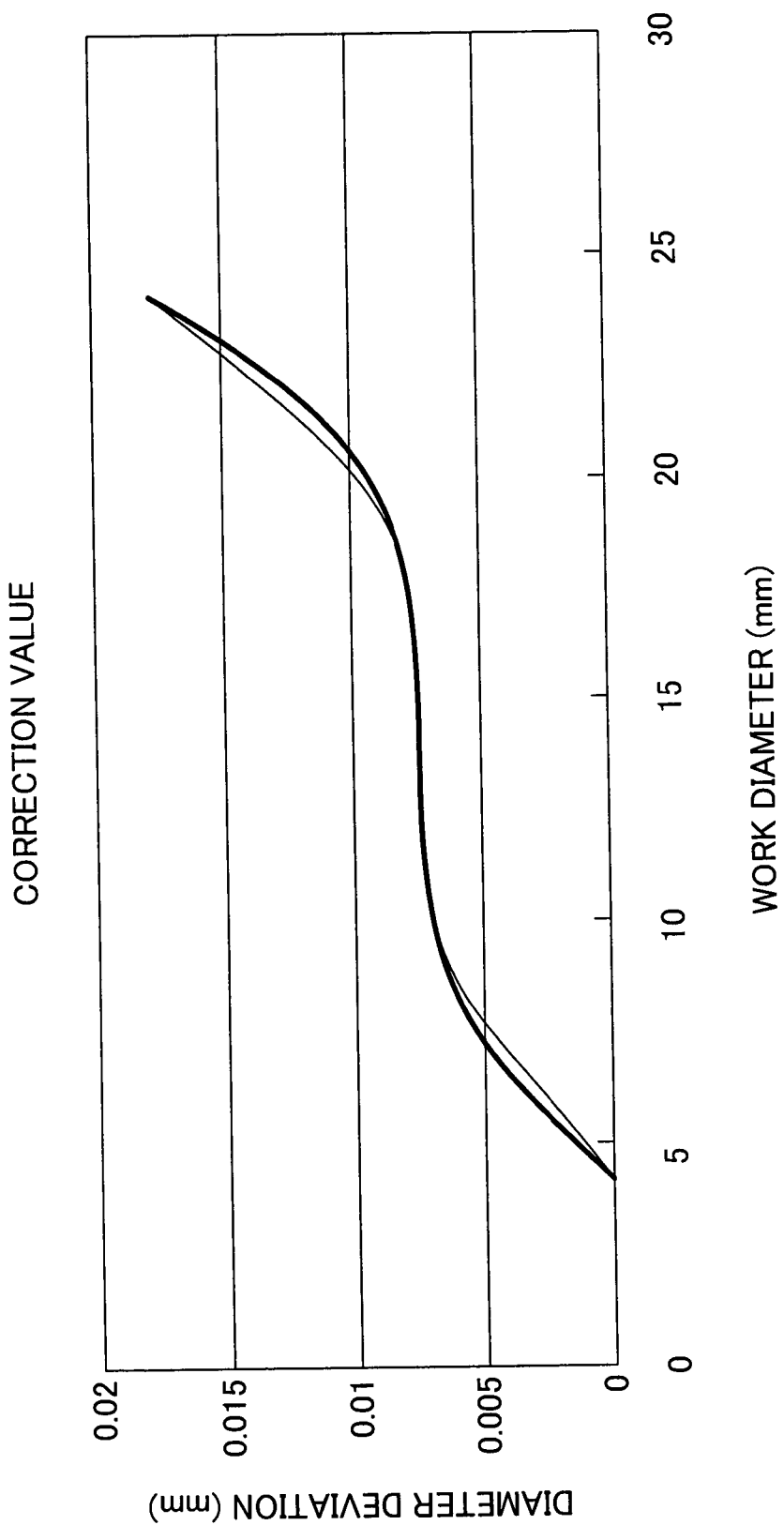
FIG. 21 is a graph explaining a correction value of the arc error.
Figure 22:
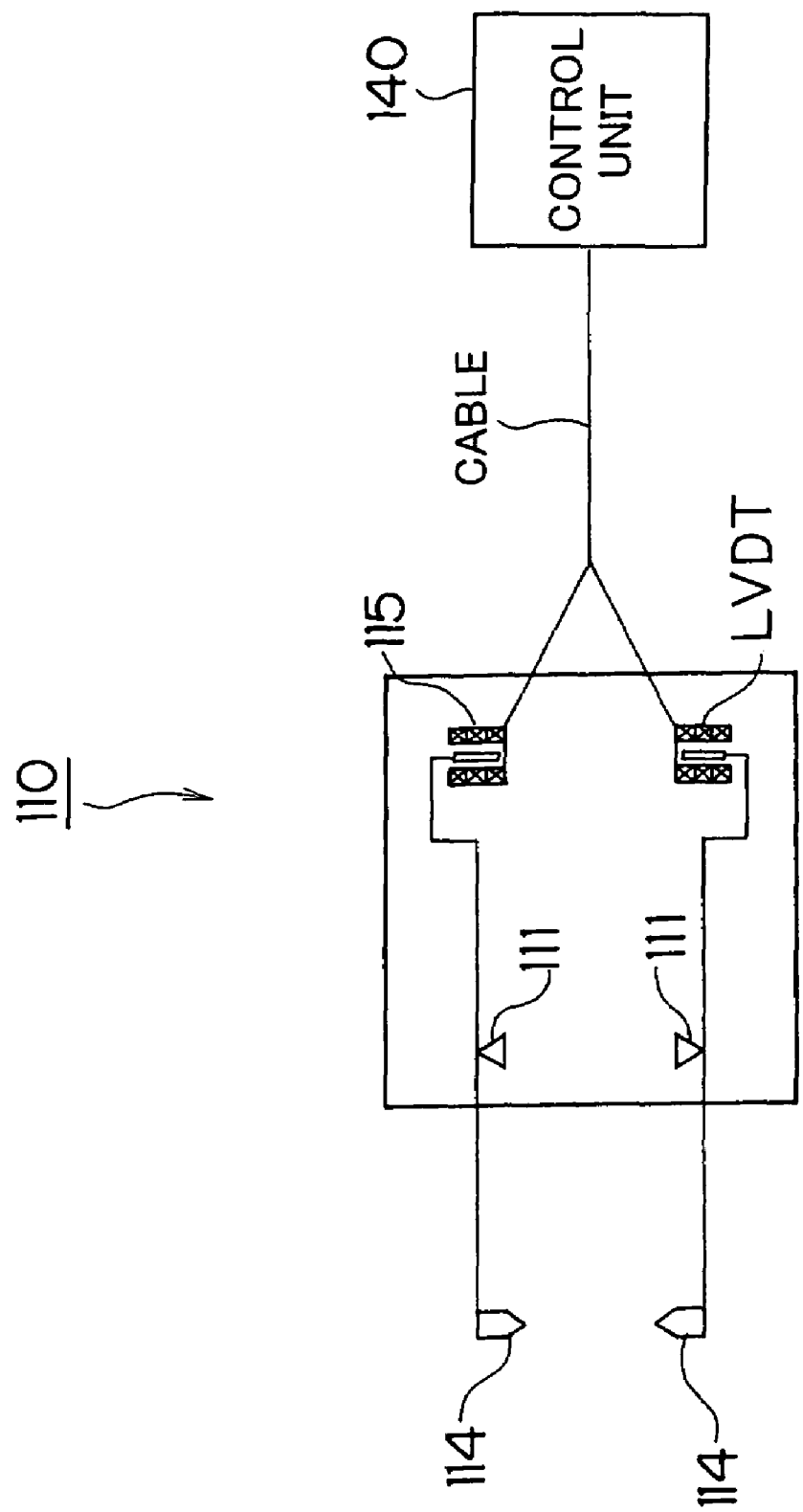
FIG. 22 is a schematic diagram showing a conventional measuring head.

FIG. 20 shows a graph of an axis deviation error during outer diameter measurement when a radius R1 of the work W is 4 mm and a tip end radius R2 of the contact element 14 is 1.5 mm. The correction value which is calculated based on the above when the distance from a center of the support point member 11 to the tip end of the contact element 14 is 155 mm is shown in the graph in FIG. 21.

In the Σ type measuring head, deviation of the abutment points of the upper and lower contact elements 14 and 14 are eliminated, and the axis height of the work W and the center position in the vertical direction of the Σ type measuring head are aligned, whereby only one master used in the calibration is needed, and is used only at the time of adjustment in the factory, and the master is not needed at a customer site.

The digital measuring head 10 of the present invention is provided with a retract device (not shown). The retract device is a release mechanism which brings the finger 13 into an open or closed state when the digital measuring head 10 is moved to the measuring point. In this retract device, a mechanism for pushing and pulling a lever with use of an air cylinder or a latching solenoid is used.

A mechanism, which uses a motor other than the air cylinder and the latching solenoid, and pushes and pulls the lever, interlocked with the movement of putting the digital measuring head 10 out and in, may be additionally provided. When the control of the falling speed of the contact element 14 from the retract state is needed, a restrictor is attached to the air cylinder and the falling speed is controlled by a flow of air. The retract device may be an internal type which is loaded in an inner portion of the digital measuring head 10, or may be an external type provided at an outer portion.

If a sudden temperature change is given to the digital measuring head 10, condensation sometimes occurs. In this case, troubles such as insufficient electrical insulation and formation of rust in the wiring portions, poor optical reading of the scale 15, and reduction in the signal level are caused. Consequently, in this embodiment, air purge method is adopted. This is the method for preventing condensation by blowing dry air into the case 22 of the digital measuring head 10. In this case, air used in the retract device may be divided and used. Other than the air purge method, a double case structure method, a heater incorporating method, and the like may be used.

As measurement items by the digital measuring head 10 of the present invention, there are an outer diameter, an inner diameter, an elevation difference (height), size measurement such as thickness, surface measurement such as roughness and swell, shape measurement, position measurement, and geometrical tolerance such as coaxiality, concentricity, straightness, cylindricity, perpendicularity, parallelism, taper degree, contour degree of a line, contour degree of a surface, gradient, position degree, symmetry degree, radial run-out, and total run-out.

As explained thus far, according to the digital measuring head of the present invention, the scale is used for the sensor, and therefore the measurement range of several ten millimeters is practically obtained as compared with the measurement range of about 1 mm when using the LVDT for the sensor, thus making wide-range measurement possible. It is not necessary to prepare a master for calibration for each diameter of size shift, and the number of masters can be reduced, thus making it possible to reduce set-up time and arranging time, and adaptation to production of various kinds in various amounts is facilitated. Reduction in the number of masters gives a large merit in the aspects of production, management, delivery time, price and the like to both the makers and the users.

Since the LVDT has an analogue signal, a zero point deviation and a drift occur, and waiting time for stability is needed, but in the digital measuring head of the present invention uses the scale, and therefore digital conversion is carried out immediately after reading the scale, thus only requiring the electric circuit of digital processing system, which carries out signal processing, making actuation measurement (cold start) possible, and improving actuation property.

Further, temperature property is remarkably improved as compared with the LVDT. Since the LVDT has a large instrumental error, correction has to be made by confirming the correction amounts one by one when the correction is made, which takes much time, but the scale has few instrumental errors, and therefore the number of man hours for adjustment and inspection can be substantially reduced.

In the case of the digital measuring head adopting the optical digital method, which performs linear movement, a complicated mechanism for converting the rotationally moving amount of the contact element into the moving amount of linear movement, and response frequency is deteriorated due to an increase in the mass of the movable parts, friction of the link support points, and the like, but the digital measuring head of the present invention can perform measurement in a wide range, and is excellent in high-speed response frequency property, thus making it possible to use the digital measuring head commonly in the contour shape measuring apparatus, the surface roughness measuring apparatus and the like.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A digital measuring head in a measuring apparatus which measures a work by making a contact element abut to the work, the digital measuring head comprising:
   an arm supported rotatably around a support point arranged on a base;
   a finger having the contact element at a tip end and mounted to a tip end portion of the arm; and
   a scale and a read head, one of which is provided at a rear end portion of the arm and the other of which is arranged on the base, wherein
   displacement of the contact element which contacts with the work is measured with the scale and the read head based on at least one of refraction and reflection of light by the scale.

2. The digital measuring head of claim 1, wherein the readhead further includes,
   an emitter adapted to emit light, and
   a receiver adapted to receive at least one of reflected and refracted light.

3. The digital measuring head of claim 1, wherein the scale reflects or refracts light emitted by the readhead.

4. The digital measuring head of claim 1, further comprising
   a pressurizing member, and
   a damper, wherein
   the pressurizing member is adapted to keep the contact element in continuous contact with the work and the damper is adapted to reduce unwanted oscillations of the arm.

5. A digital measuring apparatus comprising:
   a control unit;
   an analog to digital converter;
   an arm rotatably supported around a support point arranged on a base;
   a finger, including a contact element mounted to an end portion of the arm; and
   a scale and a read head, at least one of which is provided at a rear end portion of the arm and the other of which is arranged on the base; wherein
   displacement of the contact element which contacts with a work is measured with the scale and the read head based on at least one of refraction and reflection of light by the scale.

6. The digital measuring apparatus of claim 5, wherein the readhead further includes,
   an emitter adapted to emit light, and
   a receiver adapted to receive at least one of reflected and refracted light.

7. The digital measuring head of claim 5, wherein the scale reflects or refracts light emitted by the readhead.

8. The digital measuring head of claim 7, wherein the damper is a dash pot type damper.

9. The digital measuring head of claim 5, further comprising
   a pressurizing member, and
   a damper, wherein
   the pressurizing member is adapted to keep the contact element in continuous contact with the work and the damper is adapted to damp the jump of the contact element.

* * * * *